US006620883B2

(12) United States Patent
Gasche et al.

(10) Patent No.: US 6,620,883 B2
(45) Date of Patent: Sep. 16, 2003

(54) PROCESS FOR THE PREPARATION OF GRAFT RUBBER LATEXES HAVING A REDUCED RESIDUAL MONOMER CONTENT

(75) Inventors: Hans-Erich Gasche, Odenthal (DE); Herbert Eichenauer, Dormagen (DE); Pierre Vanhoorne, Düsseldorf (DE); Ulrich Jansen, Dormagen (DE); Eckhard Wenz, Köln (DE); Stefan Moss, Haan (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/965,702

(22) Filed: Sep. 26, 2001

(65) Prior Publication Data

US 2002/0111435 A1 Aug. 15, 2002

(30) Foreign Application Priority Data

Oct. 6, 2000 (DE) .......................... 100 49 466

(51) Int. Cl.⁷ ............................ C08L 51/04; C08L 53/02
(52) U.S. Cl. .............................. 525/64; 525/71; 525/77; 525/84; 525/87; 525/263
(58) Field of Search ............................ 525/64, 71, 77, 525/84, 87, 263

(56) References Cited

U.S. PATENT DOCUMENTS

| 4,200,593 A | | 4/1980 | van der Loose et al. ... 525/243 |
| 4,242,469 A | * | 12/1980 | Schmitt et al. ................ 525/72 |
| 4,800,216 A | | 1/1989 | Eichenauer et al. ........ 525/285 |

FOREIGN PATENT DOCUMENTS

| DE | 197 41 188 | 3/1999 |
| EP | 0 046 320 A1 | 2/1982 |
| EP | 0 281 174 A1 | 2/1988 |
| EP | 0 531 848 A1 | 3/1993 |
| EP | 0 810 242 A2 | 12/1997 |
| WO | 00/04068 | 1/2000 |
| WO | 0012569 | 3/2000 |
| WO | 00/14123 | 3/2000 |

* cited by examiner

Primary Examiner—James J. Seidleck
Assistant Examiner—Olga Asinovsky
(74) Attorney, Agent, or Firm—Joseph C. Gil; Aron Preis

(57) ABSTRACT

The invention relates to a process for the preparation of graft rubber polymers of the ABS type by emulsion polymerization according to the so-called fed batch process, in which latexes having markedly reduced residual monomer contents are obtained, and to compositions containing the mentioned graft rubber polymers. The polymers so obtained have no negative effects at all on other properties

14 Claims, No Drawings

PROCESS FOR THE PREPARATION OF GRAFT RUBBER LATEXES HAVING A REDUCED RESIDUAL MONOMER CONTENT

FIELD OF THE INVENTION

The invention relates to a process for the preparation of graft rubber polymers of the ABS type, more specifically to the preparation by emulsion polymerization.

SUMMARY OF THE INVENTION

The invention relates to a process for the preparation of graft rubber polymers of the ABS type by emulsion polymerization according to the so-called fed batch process, in which latexes having markedly reduced residual monomer contents are obtained, and to compositions containing the mentioned graft rubber polymers. The polymers so prepared have no negative effects at all on other properties.

BACKGROUND OF THE INVENTION

ABS molding compositions are two-phase plastics that contain:
I. a thermoplastic copolymer of styrene and acrylonitrile, in which the styrene may be replaced wholly or partially by α-methylstyrene or methyl methacrylate; this copolymer, also known as SAN resin or matrix resin, forms the external phase;
II. at least one graft rubber polymer (of the ABS type) that has been prepared by the graft reaction of one or more of the monomers mentioned under I. onto butadiene homo- or co-polymer ("graft base"). This graft polymer ("elastomer phase" or "graft rubber") forms the disperse phase in the matrix resin.

While the matrix resin I can easily be prepared by free-radical polymerization in solution or in suspension or by mass polymerization, it is necessary in order to produce glossy moldings to prepare the graft rubber polymer II by emulsion polymerization using rubber latexes having the necessary mean particle diameters, in order to obtain specific finely divided polymers having mean particle diameters $d_{50}$ of approximately from 0.08 to 0.5 µm.

A critical point in the case of emulsion polymerization, especially in the preparation of rubber-containing graft polymers using the so-called fed batch process (feeding of the monomers to a rubber latex located in the reactor in the course of a batch reaction) is the often very high content of unreacted monomers at the end of the reaction.

Although methods of lowering the residual monomer content in emulsion polymers are indicated in the literature, they are not suitable for achieving low residual monomer values in graft rubber polymers while retaining the other properties that are necessary.

For example, DE-A 19 741 188 describes the use of long-chained, surface-active initiator components for reducing the residual monomers. WO-A 00/12569 recommends the use of combinations of an oxidizing agent, a reducing agent prepared from aldehyde and inorganic dithionite, and polyvalent metal ions for the treatment of polymer dispersions, while WO-A 00/14123 describes treatment using an initiator system consisting of an oxidising agent and an α-hydroxycarbonyl compound. However, all those measures require the use of new auxiliary components, as a result of which the properties of the graft rubber polymers are generally altered in an undesirable manner.

DETAILED DESCRIPTION OF THE INVENTION

It has now been found that graft rubber polymers of the ABS type may be prepared by emulsion polymerization according to the fed batch process with markedly reduced residual monomer contents using conventional free-radical initiator systems without the addition of novel substances if during the reaction the initiator components are added in a specific manner.

The invention provides a process for the preparation of graft rubber polymers of the ABS type by emulsion polymerization according to the fed batch process, which process is characterised in that the free-radical initiator used for initiating polymerization or the initiator system used is added to the reaction mixture in portions or continuously in such a manner that, in the course of the reaction, a minimum of initiator or initiator system added per time interval is passed and in at least 50%, preferably at least 70% and especially at least 90% of the total reaction time, the amount of initiator added in each time interval corresponds at least to an amount $\geq 0.5$ wt. %, preferably $\geq 1$ wt. % and especially $\geq 2.5$ wt. %, of the total amount of initiator, the total reaction time comprising n time intervals where n=from 3 to 20, preferably from 3 to 15 and especially from 3 to 10, and each time interval being from 5 to 90 minutes, preferably from 10 to 80 minutes and especially from 15 to 60 minutes in length. Preferably, the amount of initiator added during every one of said time intervals is greater than zero.

In a preferred embodiment of the invention, the minimum of added initiator or initiator system per time interval is passed in the first half of the total reaction time.

Also preferably, the minimum is passed in the first or second third of the total reaction time.

The process according to the invention is usually carried out in practice by placing a rubber latex or a mixture of a plurality of rubber latexes in a stirred reactor, heating the contents of the reactor to a suitable temperature for the initiation of polymerization with free-radical initiators, adding the free-radical initiator in the manner indicated above, metering in the graft monomers and, optionally, metering in an aqueous emulsifier in parallel.

There are suitable as rubbers in the use of the process according to the invention for the preparation of graft rubber polymers in principle all rubber-like polymers in emulsion form having a glass transition temperature below 0° C.

The following may be used, for example:
diene rubbers, that is to say homopolymers of conjugated dienes having from 4 to 8 carbon atoms, such as, for example and preferably, butadiene, isoprene, chloroprene or copolymers thereof with up to 60 wt. %, preferably up to 30 wt. %, of a vinyl monomer, for example and preferably acrylonitrile, methacrylonitrile, styrene, α-methylstyrene, halostyrenes, $C_1$–$C_4$-alkylstyrenes, $C_1$–$C_8$-alkyl acrylates, $C_1$–$C_8$-alkyl methacrylates, alkylene glycol diacrylates, alkylene glycol dimethacrylates, divinylbenzene;
acrylate rubbers, that is to say homo- and co-polymers of $C_1$–$C_{10}$-alkyl acrylates, for example and preferably homopolymers of ethyl acrylate, butyl acrylate or copolymers with up to 40 wt. %, preferably not more than 10 wt. %, mono-vinyl monomers, for example and preferably styrene, acrylonitrile, vinyl butyl ether, acrylic acid (ester), methacrylic acid (ester), vinylsulfonic acid. There are preferably used acrylate rubber homo- and co-polymers that contain from 0.01 to 8 wt. % divinyl or polyvinyl compounds and/or N-methylolacrylamide or N-methylolmethacrylamide or other compounds acting as crosslinking agents, for example divinylbenzene and, preferably, triallyl cyanurate.

Preference is given to polybutadiene rubbers, SBR rubbers having up to 30 wt. % styrene polymerized therein, and acrylate rubbers, especially those having a core/shell structure, for example as described in DE-A 3 006 804.

For the preparation of graft rubber polymers by the process according to the invention latexes having mean particle diameters $d_{50}$ of from 0.05 to 2.0 μm, preferably from 0.08 to 1.0 μm and especially from 0.1 to 0.5 μm may be considered. The gel contents of the rubbers that are used may be varied within wide limits; they are preferably from 30 to 95 wt. % (determined by the wire cage method in toluene).

Very special preference is given to mixtures of rubber latexes having
a) mean particle diameters $d_{50} \leq 320$ nm, preferably from 260 to 310 nm, and gel contents $\leq 70$ wt. %, preferably from 40 to 65 wt. %, and
b) mean particle diameters $d_{50} \geq 370$ nm, preferably from 380 to 450 nm, and gel contents $\geq 70$ wt. %, preferably from 75 to 90 wt. %.

The breadth of particle size distribution of the rubber latex (a) is preferably from 30 to 100 nm, especially from 40 to 80 nm, and that of the rubber latex (b) is from 50 to 500 nm, especially from 100 to 400 nm (in each case measured as the $d_{90} - d_{10}$ value from the integral particle size distribution).

The mixtures contain the rubber latexes (a) and (b) preferably in a weight ratio of from 90:10 to 10:90, especially from 60:40 to 30:70 (in each case based on the respective solids content of the latexes).

The mean particle diameters are determined by means of ultracentrifuge (see W. Scholtan, H. Lange: Kolloid-Z. u Z. Polymere 250, p. 782–796 (1972)).

The indicated values for the gel content relate to determination by the wire cage method in toluene (see Houben-Weyl, Methoden der Organischen Chemie, Makromolekulare Stoffe, Part 1, p. 307 (1961), Thieme Verlag Stuttgart).

The rubber latexes used may be prepared by emulsion polymerization; the necessary reaction conditions, auxiliary substances and working techniques are known in principle.

It is also possible first to prepare a finely divided rubber polymer by known methods and then agglomerate it in a known manner in order to adjust it to the required particle size. Relevant techniques are described (see EP-A 0 029 613; EP-A 0 007 810; DD-A 144 415; DE-A 12 33 131; DE-A 12 58 076; DE-A 21 01 650; GB 1 379 391).

It is also possible to work by the so-called seed polymerization technique, in which, for example, a finely divided butadiene polymer is first prepared and then further polymerized to larger particles by further reaction with monomers containing butadiene.

There may be used as emulsifiers the conventional anionic emulsifiers such as alkyl sulfates, alkyl sulfonates, aralkyl sulfonates, soaps of saturated or unsaturated fatty acids (e.g., oleic acid, stearic acid) as well as alkaline disproportionated or hydrogenated abietic or talloleic acid; emulsifiers having a carboxyl group (e.g., salts of $C_{10}$–$C_{18}$ fatty acids, disproportionated abietic acid, emulsifiers according to DE-A 36 39 904 and DE-A 39 13 509) are preferably used.

Rubber polymer latexes may also in principle be prepared by emulsification of finished rubber polymers in aqueous media (see Japanese patent application JP-A 55 125 102).

Suitable graft monomers that are polymerized in the presence of the rubber-like polymers in emulsion form are in practice all compounds that may be polymerized in emulsion to thermoplastic resins, for example vinyl aromatic compounds of formula (I) or compounds of formula (II) or mixtures thereof

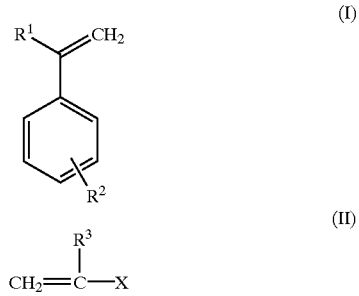

in which
$R^1$ represents hydrogen or methyl,
$R^2$ represents hydrogen, halogen or alkyl having from 1 to 4 carbon atoms in the ortho-, meta- or para-position,
$R^3$ represents hydrogen or methyl
and
X represents CN, $R^4$OOC or $R^5R^6$NOC,
wherein
$R^4$ represents hydrogen or alkyl having from 1 to 4 carbon atoms, and
$R^5$ and $R^6$ each independently of the other represents hydrogen, phenyl or alkyl having from 1 to 4 carbon atoms.

There may be mentioned by way of example and preferably for compounds of formula (I) styrene, α-methylstyrene, p-methylstyrene and vinyltoluene. Preferred compounds of formula (II) are acrylonitrile and methyl methacrylate. Further monomers that are suitable in principle are, for example, vinyl acetate and N-phenylmaleimide.

Preferred monomers are mixtures of styrene and acrylonitrile, α-methylstyrene and acrylonitrile, of styrene, acrylonitrile and methyl methacrylate, as well as combinations of those monomer mixtures with N-phenylmaleimide.

Preferred graft polymers prepared according to the invention are those that are obtained by the graft polymerization of styrene and acrylonitrile in a weight ratio of from 90:10 to 50:50, preferably from 80:20 to 65:35 (it being possible for styrene to be replaced wholly or partially by α-methylstyrene or methyl methacrylate) in the presence of amounts of rubber, preferably polybutadiene, such that graft polymers having rubber contents of from 30 to 80 wt. %, preferably from 35 to 75 wt. % and especially from 35 to 70 wt. %, result.

Suitable initiators include inorganic and organic peroxides, for example $H_2O_2$, di-tert-butyl peroxide, cumene hydroperoxide, dicyclohexyl percarbonate, p-menthane hydroperoxide, tert-butyl hydroperoxide, azo initiators, such as, for example, azobisisobutyronitrile, inorganic per-salts, such as potassium peroxodisulfate, sodium peroxodisulfate, ammonium peroxodisulfate, potassium perphosphate, sodium perborate, as well as redox systems, which are composed of a—generally organic—oxidising agent and a reducing agent, it being possible for heavy metal ions additionally to be present in the reaction medium (see H. Logemann in Houben-Weyl, Methoden der organischen Chemie, Vol. 14/1, p. 263–297).

Preferred initiators are potassium peroxodisulfate, sodium peroxodisulfate, ammonium peroxodisulfate or mixtures thereof, as well as cumene hydroperoxide, p-menthane hydroperoxide, tert-butyl hydroperoxide or mixtures thereof.

Reducing agents that may be used according to the invention are preferably water-soluble compounds having a reducing action, preferably selected from the group of the salts of sulfinic acid, salts of sulfurous acid, sodium dithionite, sodium sulfite, sodium hyposulfite, sodium hydrogen sulfite, ascorbic acid and salts thereof, Rongalit C (sodium formaldehyde sulfoxylate), mono- and di-hydroxyacetone, sugars (e.g. glucose or dextrose). In principle it is also possible to use, for example, iron(II) salts, such as, for example, iron(II) sulfate, tin(II) salts, such as, for example, tin(II) chloride, titanium(III) salts, such as titanium(III) sulfate; however, it is preferred that no such metal salts be used.

Especially preferred reducing agents are dextrose, ascorbic acid (salts) or sodium formaldehyde sulfoxylate (Rongalit C).

The reaction temperature in the use of the process according to the invention for the preparation of graft rubber polymers may be varied within wide limits. It is generally from 25° C. to 160° C., preferably from 40° C. to 90° C. and especially from 50° C. to 85° C. The graft polymerization is carried out in such a manner that the temperature difference between the beginning and the end of the reaction is at least 10° C., preferably at least 15° C. and especially at least 20° C.

Together with the graft monomers, from 0.05 to 1.00 part by weight (per 100 parts by weight of graft monomer), preferably from 0.08 to 0.8 part by weight (per 100 parts by weight of graft monomer), of one or more mercaptans may be added.

Suitable mercaptans are, for example, aliphatic mercaptans, such as ethyl-, n-propyl-, n-butyl-, tert-butyl-, n-pentyl-, n-hexyl-, n-octyl-, n-decyl-, n-dodecyl-, tert-dodecyl-, n-hexadecyl- and n-octadecyl-mercaptan, or aromatic mercaptans, such as thiophenol. Preferred mercaptans are tert-dodecylmercaptan and n-dodecylmercaptan and mixtures thereof.

In principle there may also be used other molecular-weight-regulating substances, such as, for example, dimeric α-methylstyrene or terpinols, in amounts of from 0.5 to 5 parts by weight, preferably from 1 to 3 parts by weight (in each case per 100 parts by weight of graft monomer).

The above-mentioned compounds may be used as emulsifier in the graft polymerization reaction.

By the process according to the invention, the desired effect of a reduced amount of residual monomers at the end of the graft polymerization reaction using common free-radical initiator systems is achieved, if the initiator system is added to the reaction mixture in portions or continuously in such a manner that a minimum of added initiator is passed in the course of the reaction.

It has been found to be particularly effective if the minimum is passed in the first half of the total reaction time or in the first or second third of the total reaction time.

The graft rubber polymers prepared by the process according to the invention preferably have a rubber content of from 30 to 80 wt. %, especially from 35 to 75 wt. %.

In order to produce thermoplastic molding compositions, the graft rubber polymer prepared according to the invention, after conventional working up (e.g. by coagulation with salts and/or acids, washing and drying or by spray drying), is mixed with at least one rubber-free matrix resin.

There are used as rubber-free copolymers preferably copolymers of styrene and acrylonitrile in a weight ratio of from 95:5 to 50:50, it being possible for styrene and/or acrylonitrile to be replaced wholly or partially by α-methylstyrene, methyl methacrylate or N-phenylmaleimide.

Special preference is given to copolymers having contents of incorporated acrylonitrile units of <30 wt. %.

Such copolymers preferably have mean molecular weights $\overline{M}_W$ of from 20,000 to 200,000 and limiting viscosities [η] of from 20 to 110 ml/g (measured in dimethylformamide at 25° C.).

Details regarding the preparation of such resins are described, for example, in DE-AS 2 420 358 and DE-AS 2 724 360. Vinyl resins prepared by mass or solution polymerization have proved to be especially suitable. The copolymers may be added alone or in any desired mixture.

In addition to thermoplastic resins composed of vinyl monomers, it is also possible to use polycondensation products, for example aromatic polycarbonates, aromatic polyester carbonates, polyesters, polyamides, as the rubber-free copolymer in the molding compositions according to the invention.

Suitable thermoplastic polycarbonates and polyester carbonates are known (see, for example, DE-A 1 495 626, DE-A 2 232 877, DE-A 2 703 376, DE-A 2 714 544, DE-A 3 000 610, DE-A 3 832 396, DE-A 3 077 934); they may be prepared, for example, by reaction of diphenols of formulae (III) and (IV)

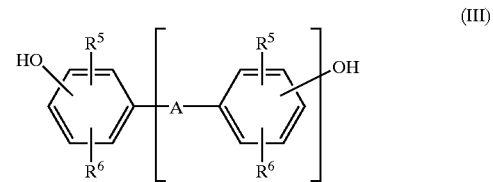

(III)

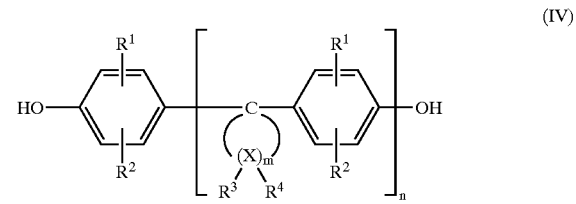

(IV)

wherein

A is a single bond, $C_1$–$C_5$-alkylene, $C_2$–$C_5$-alkylidene, $C_5$–$C_6$-cycloalkylidene, —O—, —S—, —SO—, —$SO_2$— or —CO—, $R^5$ and $R^6$ each independently of the other represents hydrogen, methyl or halogen, especially hydrogen, methyl, chlorine or bromine, $R^1$ and $R^2$ each independently of the other represents hydrogen, halogen, preferably chlorine or bromine, $C_1$–$C_8$-alkyl, preferably methyl, ethyl, $C_5$–$C_6$-cycloalkyl, preferably cyclohexyl, $C_6$–$C_{10}$-aryl, preferably phenyl, or $C_7$–$C_{12}$-aralkyl, preferably phenyl-$C_1$–$C_4$-alkyl, especially benzyl, m is an integer from 4 to 7, preferably 4 or 5, n is 0 or 1, $R^3$ and $R^4$ are selected individually for each X and each independently of the other represents hydrogen or $C_1$–$C_6$-alkyl, and X represents carbon, with carbonic acid halides, preferably phosgene, and/or with aromatic dicarboxylic acid dihalides, preferably benzenedicarboxylic acid dihalides, by phase-boundary polycondensation, or with phosgene by polycondensation in a homogeneous phase (the so-called pyridine process), wherein the molecular weight may be adjusted in a known manner by an appropriate amount of known chain terminators.

Suitable diphenols of formulae (III) and (IV) are, for example, hydroquinone, resorcinol, 4,4'-dihydroxydiphenyl, 2,2-bis-(4-hydroxyphenyl)-propane, 2,4-bis-(4-hydroxyphenyl)-2-methylbutane, 2,2-bis-(4-hydroxy-3,5-dimethylphenyl)-propane, 2,2-bis-(4-hydroxy-3,5-dichlorophenyl)-propane, 2,2-bis-(4-hydroxy-3,5-dibromophenyl)-propane, 1,1-bis-(4-hydroxyphenyl)-cyclohexane, 1,1-bis-(4-hydroxyphenyl)-3,3,5-trimethylcyclohexane, 1,1-bis-(4-hydroxyphenyl)-3,3-dimethylcyclohexane, 1,1-bis-(4-hydroxyphenyl)-3,3,5,5-tetramethylcyclohexane or 1,1-bis-(4-hydroxyphenyl)-2,4,4-trimethylcyclopentane.

Preferred diphenols of formula (III) are 2,2-bis-(4-hydroxyphenyl)-propane and 1,1-bis-(4-hydroxyphenyl)-cyclohexane, and the preferred phenol of formula (IV) is 1,1-bis-(4-hydroxyphenyl)-3,3,5-trimethylcyclohexane.

It is also possible to use mixtures of diphenols.

Suitable chain terminators are, for example, phenol, p-tert-butylphenol, long-chained alkylphenols such as 4-(1,3-tetramethyl-butyl)phenol according to DE-OS 2 842 005, monoalkylphenols, dialkylphenols having a total of from 8 to 20 carbon atoms in the alkyl substituents according to DE-OS 3 506 472, such as p-nonylphenol, 2,5-di-tert-butylphenol, p-tert-octylphenol, p-dodecylphenol, 2-(3,5-dimethylheptyl)-phenol and 4-(3,5-dimethylheptyl)-phenol. The amount of chain terminators required is generally from 0.5 to 10 mol %, based on the sum of the diphenols (III) and (IV).

The polycarbonates or polyester carbonates that are suitable may be linear or branched; branched products are preferably obtained by incorporation of from 0.05 to 2.0 mol %, based on the sum of the diphenols used, of compounds having a functionality of three or more than three, for example compounds having three or more than three phenolic OH groups.

The polycarbonates or polyester carbonates that are suitable may contain aromatically bonded halogen, preferably bromine and/or chlorine; preferably, they are halogen-free.

They have mean molecular weights ($\overline{M}_W$, weight-average), determined, for example, by ultracentrifugation or scattered light measurement, of from 10,000 to 200,000, preferably from 20,000 to 80,000.

Suitable thermoplastic polyesters are preferably polyalkylene terephthalates, that is to say reaction products of aromatic dicarboxylic acids or reactive derivatives thereof (e.g. dimethyl esters or anhydrides) and aliphatic, cycloaliphatic or arylaliphatic diols, and mixtures of such reaction products.

Preferred polyalkylene terephthalates may be prepared from terephthalic acids (or reactive derivatives thereof) and aliphatic or cycloaliphatic diols having from 2 to 10 carbon atoms according to known methods (Kunststoff-Handbuch, Volume VIII, p. 695 et seq, Carl Hanser Verlag, Munich 1973).

In preferred polyalkylene terephthalates, from 80 to 100 mol %, preferably from 90 to 100 mol %, of the dicarboxylic acid radicals are terephthalic acid radicals, and from 80 to 100 mol %, preferably from 90 to 100 mol %, of the diol radicals are ethylene glycol and/or 1,4-butanediol radicals.

The preferred polyalkylene terephthalates may contain, in addition to ethylene glycol or 1,4-butanediol radicals, from 0 to 20 mol % of radicals of other aliphatic diols having from 3 to 12 carbon atoms or cycloaliphatic diols having from 6 to 12 carbon atoms, for example radicals of 1,3-propanediol, 2-ethyl-1,3-propanediol, neopentyl glycol, 1,5-pentanediol, 1,6-hexanediol, 1,4-cyclohexanedimethanol, 3-methyl-1,3- and -1,6-pentanediol, 2-ethyl-1,3-hexanediol, 2,2-diethyl-1,3-propanediol, 2,5-hexanediol, 1,4-di(β-hydroxyethoxy)-benzene, 2,2-bis-(4-hydroxycyclo-hexyl)-propane, 2,4-dihydroxy-1,1,3,3-tetramethylcyclobutane, 2,2-bis-(3-β-hydroxyethoxyphenyl)-propane and 2,2-bis-(4-hydroxypropoxyphenyl)-propane (DE-OS 2 407 647, 2 407 776, 2 715 932).

The polyalkylene terephthalates may be branched by incorporation of relatively small amounts of tri- or tetra-hydric alcohols or tri- or tetra-basic carboxylic acids, such as are described in DE-OS 1 900 270 and U.S. Pat. No. 3,692,744. Examples of preferred branching agents are trimesic acid, trimellitic acid, trimethylol-ethane and -propane and pentaerythritol. It is advisable to use not more than 1 mol % of the branching agent, based on the acid component.

Special preference is given to polyalkylene terephthalates that have been prepared solely from terephthalic acid and reactive derivatives thereof (e.g. dialkyl esters thereof) and ethylene glycol and/or 1,4-butanediol, and mixtures of such polyalkylene terephthalates.

Preferred polyalkylene terephthalates are also copolyesters prepared from at least two of the above-mentioned alcohol components: especially preferred copolyesters are poly-(ethylene glycol 1,4-butanediol)terephthalates.

The polyalkylene terephthalates that are preferably suitable generally have an intrinsic viscosity of from 0.4 to 1.5 dl/g, preferably from 0.5 to 1.3 dl/g, especially from 0.6 to 1.2 dl/g, in each case measured in phenol/o-dichlorobenzene (1:1 parts by weight) at 25° C.

Suitable polyamides are known homopolyamides, copolyamides and mixtures of such polyamides. They may be semi-crystalline and/or amorphous polyamides.

Suitable semi-crystalline polyamides are polyamide-6, polyamide-6,6, mixtures and corresponding copolymers of those components. There come into consideration also semi-crystalline polyamides the acid component of which consists wholly or partially of terephthalic acid and/or isophthalic acid and/or suberic acid and/or sebacic acid and/or azelaic acid and/or adipic acid and/or cyclohexanedicarboxylic acid, the diamine component of which consists wholly or partially of m- and/or p-xylylene-diamine and/or hexamethylenediamine and/or 2,2,4-trimethylhexamethyl-enediamine and/or isophoronediamine, and the composition of which is in principle known.

Mention may also be made of polyamides that are prepared wholly or partially from lactams having from 7 to 12 carbon atoms in the ring, optionally with the concomitant use of one or more of the above-mentioned starting components.

Especially preferred semi-crystalline polyamides are polyamide-6 and polyamide-6,6 and mixtures thereof. Known products may be used as amorphous polyamides. They are obtained by polycondensation of diamines, such as ethylenediamine, hexamethylenediamine, decamethylenediamine, 2,2,4- and/or 2,4,4-trimethylhexamethylene-diamine, m- and/or p-xylylenediamine, bis-(4-aminocyclohexyl)-methane, bis-(4-aminocyclohexyl)-propane, 3,3'-dimethyl-4,4'-diamino-dicyclohexylmethane, 3-aminomethyl-3,5,5-trimethylcyclohexylamine, 2,5- and/or 2,6-bis-(aminomethyl)-norbornane and/or 1,4-diaminomethyl-cyclohexane, with dicarboxylic acids, such as oxalic acid, adipic acid, azelaic acid, decanedicarboxylic acid, heptadecanedicarboxylic acid, 2,2,4- and/or 2,4,4-trimethyladipic acid, isophthalic acid and terephthalic acid.

Also suitable are copolymers obtained by polycondensation of a plurality of monomers, as well as copolymers prepared with the addition of aminocarboxylic acids, such as ε-aminocaproic acid, ω-aminoundecanoic acid or ω-aminolauric acid or their lactams.

Especially suitable amorphous polyamides are the polyamides prepared from isophthalic acid, hexamethylenediamine and further diamines, such as 4,4'-diaminodicyclohexylmethane, isophoronediamine, 2,2,4- and/or 2,4,4-trimethylhexamethylenediamine, 2,5- and/or 2,6-bis-(aminomethyl)-norbornene; or from isophthalic acid, 4,4'-diamino-dicyclohexylmethane and ε-caprolactam; or from isophthalic acid, 3,3'-dimethyl-4,4'-diamino-dicyclohexylmethane and laurinlactam; or from terephthalic acid and the isomeric mixture of 2,2,4- and/or 2,4,4-trimethylhexamethylenediamine.

Instead of pure 4,4'-diaminodicyclohexylmethane it is also possible to use mixtures of the position-isomeric diaminodicyclohexylmethanes, which are composed of from 70 to 99 mol % of the 4,4'-diamino isomer from 1 to 30 mol % of the 2,4'-diamino isomer from 0 to 2 mol % of the 2,2'-diamino isomer and optionally corresponding to more highly condensed diamines, which are obtained by hydrogenation of industrial grade diaminodiphenylmethane. Up to 30% of the isophthalic acid may be replaced by terephthalic acid.

The polyamides preferably have a relative viscosity (measured on a 1 wt. % solution in m-cresol at 25° C.) of from 2.0 to 5.0, especially from 2.5 to 4.0.

The graft rubbers prepared according to the invention are used in amounts of from 1 to 80 wt. %, based on the total molding composition.

For the preparation of the molding compositions, the graft rubber polymer prepared according to the invention may be mixed with the matrix resin in various ways. If the matrix resin is prepared by emulsion polymerization, then the latexes may be mixed and precipitated together, or alternatively they may be precipitated separately and the resulting solid substances mixed.

If, for example, the matrix resin is prepared by solution or mass polymerization, then the graft rubber polymer must be precipitated separately. Known processes are used therefor, for example the addition of salts and/or acids, following which the precipitated products are washed, dried and, optionally, converted from powder form into the form of a granulate. Suitable operation units include mixing apparatuses for precipitated products or granulates, for example, multi-cylinder mills, mixing extruders or internal kneaders.

During preparation, working up, further processing and final forming, there may be added to the molding compositions according to the invention the additives that are necessary or advantageous, for example antioxidants, UV stabilisers, peroxide destroyers, antistatics, lubricants, mould-release agents, flameproofing agents, fillers or reinforcing agents (glass fibres, carbon fibres, etc.), colourings.

Molding may be carried out on commercial processing devices and comprises, for example, injection molding, the extrusion of sheets with optional subsequent thermoforming, cold forming, extrusion of pipes and profiles, processing by calendering.

The invention is further illustrated but is not intended to be limited by the following examples in which all parts and percentages are by weight unless otherwise specified.

EXAMPLES

Examples A (Redox Initiation)

58 parts by weight (calculated as solid) of a polybutadiene latex mixture (50 wt. % having a mean particle diameter $d_{50}$ of 398 nm and a gel content of 73 wt. %, and 50 wt. % having a mean particle diameter $d_{50}$ of 282 nm and a gel content of 58 wt. %, both prepared by free-radical polymerization) are brought to a solids content of approximately 20 wt. % with water. Heating is then carried out to 59° C., and 42 parts by weight of a monomer mixture (styrene/acrylonitrile=73:27) and 1.72 parts by weight (calculated as solid substance) of the sodium salt of a resin acid mixture (Dresinate 731, Abieta Chemie GmbH, Gersthofen), dissolved in alkalised water, are added in parallel in the course of 240 minutes. In addition, starting at the time of the monomer addition, 0.31 part by weight of tert-butyl hydroperoxide and 0.38 part by weight of sodium ascorbate (in the form of an aqueous solution) are added in parallel in the course of 540 minutes according to Table 1. The reaction temperature is raised to 85° C. in the course of the first 5 hours and then maintained at that value.

At the end of the reaction, the latex is cooled to 23° C.; the residual monomers are then determined by gas chromatography by the headspace technique. The values are likewise given in Table 1.

It will be seen therefrom that, when the process according to the invention is used, graft rubber latexes having drastically reduced residual monomer contents are obtained.

In order to examine the properties of molding compositions containing the graft rubber polymers A (Examples 1 to 3 and Comparison Examples 4 and 5), the graft latexes obtained at the end of the reaction, after addition of approximately 1 part by weight of a phenolic antioxidant, were coagulated with a magnesium sulfate/acetic acid mixture and, after washing with water, the resulting powder was dried at 70° C.

23.8 parts by weight of the graft rubber powder were mixed in an internal kneader with 32.7 parts by weight of a styrene/acrylonitrile=72:28 copolymer resin $\overline{M}_W \approx 85,000$), 42.6 parts by weight of a linear aromatic polycarbonate of 2,2-bis-(4-hydroxyphenyl)-propane (bisphenol A) having a relative viscosity of 1.26 (measured in $CH_2Cl_2$ at 25° C. in the form of a 0.5 wt. % solution), corresponding to a $\overline{M}_W$ of approximately 25,000, and 0.75 part by weight of pentaerythritol tetrastearate, and then processed at 260° C. to test specimens.

The notched bar impact strength, determined by method ISO 180 1A on rods measuring 80×10×4 mm at room temperature, was in a range from 60 to 65 $kJ/m^2$, the melt flowability MVR by method DIN 53 753 at 260° C. (5 kg load) was from 5.1 to 5.5; all moldings exhibited an equally high surface gloss.

It will be seen from those results that the process according to the invention for the preparation of graft rubber has no negative effects on the properties of the graft rubber polymers or products containing them.

Examples B (Potassium Peroxodisulfate Initiation)

50 parts by weight (calculated as solid) of a polybutadiene latex having a mean particle diameter $d_{50}$ of 127 nm and a gel content of 90 wt. % (prepared by free-radical polymerization) are brought to a solids content of approximately 20 wt. % with water. Heating is then carried out to 59° C., and 50 parts by weight of a monomer mixture (styrene/acrylonitrile=73:27) and 1.34 parts by weight (calculated as solid substance) of the sodium salt of a resin acid mixture (Dresinate 731, Abieta Chemie GmbH, Gersthofen), dissolved in alkalised water, are added in parallel in the course of 360 minutes. In addition, starting at the time of the monomer addition, 0.5 part by weight of potassium peroxodisulfate (dissolved in water) is added in parallel in the course of 540 minutes according to Table 2. The reaction temperature is raised to 82° C. in the course of the first 6 hours and then maintained at that value.

At the end of the reaction, the latex is cooled to 23° C.; the residual monomers are then determined by gas chromatography by the headspace technique. The values are likewise given in Table 2.

In this case too it will clearly be seen that the process according to the invention yields markedly reduced residual monomer contents.

TABLE 1

Addition of initiator in the preparation of graft rubber polymers by redox initiation, and resulting residual monomer contents

| Example | Addition of the initiator (%) | | | | | | | | | Residual monomers | |
|---|---|---|---|---|---|---|---|---|---|---|---|
| | 1 h | 2 h | 3 h | 4 h | 5 h | 6 h | 7 h | 8 h | 9 h | Styrene (ppm) | Acrylonitrile (ppm) |
| 1 | 21 | 7 | 7 | 8 | 9 | 10 | 11 | 12 | 15 | 650 | 120 |
| 2 | 30 | 10 | 5 | 5 | 5 | 6 | 10 | 13 | 16 | 550 | 110 |
| 3 | 16 | 13 | 10 | 6 | 5 | 5 | 5 | 10 | 30 | 1160 | 150 |
| 4 (comparison) | 12 | 11 | 11 | 11 | 11 | 11 | 11 | 11 | 11 | 6410 | 550 |
| 5 (comparison) | 30 | 10 | 5 | 0 | 0 | 10 | 10 | 15 | 20 | 5260 | 540 |

TABLE 2

Addition of initiator in the preparation of graft rubber polymers by potassium peroxodisulfate initiation, and resulting residual monomer contents

| Example | Addition of the initiator (%) | | | | | | | | | Residual monomers | |
|---|---|---|---|---|---|---|---|---|---|---|---|
| | 1 h | 2 h | 3 h | 4 h | 5 h | 6 h | 7 h | 8 h | 9 h | Styrene (ppm) | Acrylonitrile (ppm) |
| 6 | 45 | 4 | 4 | 5 | 7 | 7 | 8 | 9 | 11 | 2600 | 80 |
| 7 | 30 | 10 | 5 | 5 | 5 | 6 | 10 | 13 | 16 | 2850 | 110 |
| 8 | 35 | 15 | 7 | 6 | 5 | 4 | 8 | 10 | 10 | 3100 | 90 |
| 9 (comparison) | 100 | — | — | — | — | — | — | — | — | 5100 | 450 |
| 10 (comparison) | 12 | 11 | 11 | 11 | 11 | 11 | 11 | 11 | 11 | 4650 | 410 |

Although the invention has been described in detail in the foregoing for the purpose of illustration, it is to be understood that such detail is solely for that purpose and that variations may be made therein by those skilled in the art without departing from the spirit and scope of the invention except as it may be limited by the claims.

What is claimed is:

1. A process for the preparation of graft rubber polymers of the ABS type by emulsion polymerization and according to the fed batch process, characterised in that the initiator used for initiating polymerization or the initiator system used is added to the reaction mixture in portions or continuously in such a manner that, in the course of the reaction, a minimum of initiator or initiator system added per time interval is passed and in at least 50% of the total reaction time the amount of initiator added in each time interval corresponds at least to an amount $\geq 0.5\%$ of the total amount of initiator, the total reaction time comprising n time intervals where n=from 3 to 20, and each time interval being from 5 to 90 minutes in length.

2. Process for the preparation of graft rubber polymers of the ABS type by emulsion polymerization according to the fed batch process, characterised in that the initiator used for initiating polymerization or the initiator system used is added to the reaction mixture in portions or continuously in such a manner that, in the course of the reaction, a minimum of initiator or initiator system added per time interval is passed and in at least 70% of the total reaction time the amount of initiator added in each time interval corresponds at least to an amount $\geq 1\%$ of the total amount of initiator, the total reaction time comprising n time intervals where n=from 3 to 15, and each time interval being from 10 to 80 minutes in length.

3. Process according to claim 1 characterised in that the minimum of initiator or initiator system added per time interval is passed in the first half of the total reaction time.

4. Process according to claim 1 characterised in that the minimum of initiator or initiator system added per time interval is passed in the first or second third of the total reaction time.

5. Process according to claim 1 characterised in that potassium peroxodisulfate, sodium peroxodisulfate, ammonium peroxodisulfate or mixtures thereof are used as the initiator.

6. Process according to claim 1 characterised in that a combination of organic peroxide and dextrose and/or ascorbic acid (salt) is used as the initiator system.

7. Process according to claim 6, characterised in that cumene hydroperoxide, p-menthane hydroperoxide, tert-butyl hydroperoxide or mixtures thereof are used as the peroxide.

8. A process for the preparation of graft rubber polymers by emulsion polymerization reaction according to the feed batch method comprising dividing the time of reaction into equal intervals and adding the initiator such that
  (a) the rate of addition per interval passes through a minimum, said minimum reached in neither the first nor the last intervals, and
  (b) during at least 50% of the total time of reaction the amount of initiator added per time interval is at least 0.5 wt. % of the total amount of initiator, said intervals being 3 to 20 in number, each being 5 to 90 minutes long.

9. A process for the preparation of graft rubber polymers by emulsion polymerization reaction according to the feed batch method comprising dividing the time of reaction into equal intervals and adding the initiator such that
  (c) the rate of addition per interval passes through a minimum, said minimum reached in neither the first nor the last intervals, and
  (d) during at least 70% of the total time of reaction the amount of initiator added per time interval is at least 1.0 wt. % of the total amount of initiator, said intervals being 3 to 15 in number, each being 10 to 80 minutes long.

10. The process according to claim 8 wherein the minimum is passed in the first half of the total reaction time.

11. The process according to claim 8 wherein the minimum is passed in the first or second thirds of the total reaction time.

12. The process according to claim 8 wherein initiator is at least one member selected from the group consisting of potassium peroxodisulfate, sodium peroxodisulfate and ammonium peroxodisulfate.

13. The process according to claim 8 wherein the initiator is a combination of an organic peroxide and dextrose and/or ascorbic acid (salt).

14. The process according to claim 13 wherein the peroxide is at least one member selected from the group consisting of cumene hydroperoxide, p-menthane hydroperoxide and tert-butyl hydroperoxide.

* * * * *